No. 620,812. Patented Mar. 7, 1899.
J. W. WARD.
NUT LOCK AND RAIL JOINT.
(Application filed Dec. 29, 1898.)
(No Model.)
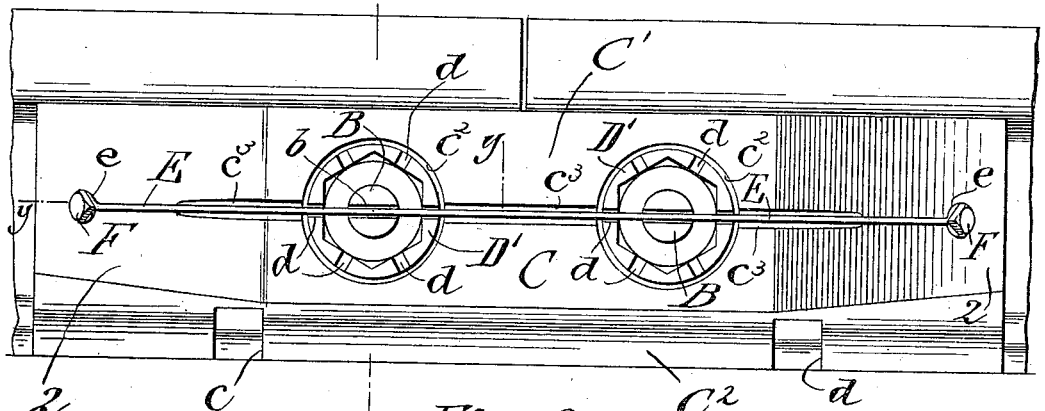
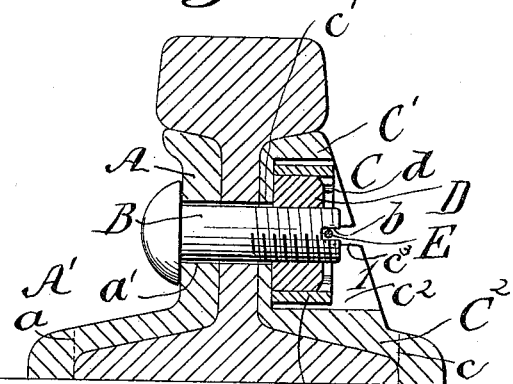
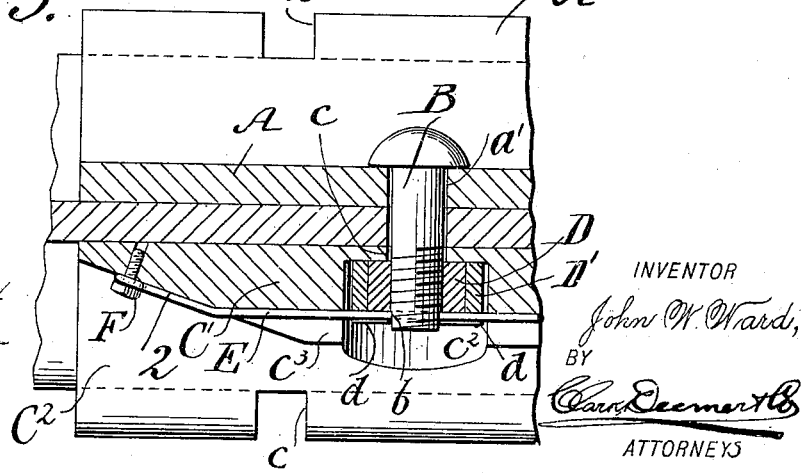
WITNESSES
INVENTOR
John W. Ward,
BY
ATTORNEYS

UNITED STATES PATENT OFFICE.

JOHN W. WARD, OF SOMERVILLE, NEW JERSEY.

NUT-LOCK AND RAIL-JOINT.

SPECIFICATION forming part of Letters Patent No. 620,812, dated March 7, 1899.

Application filed December 29, 1898. Serial No. 700,582. (No model.)

*To all whom it may concern:*

Be it known that I, JOHN W. WARD, a citizen of the United States, and a resident of Somerville, county of Somerset, and State of New Jersey, have invented certain new and useful Improvements in Nut-Locks and Rail-Joints, of which the following is a specification, reference being had to the accompanying drawings, forming a part thereof, in which similar letters of reference indicate corresponding parts.

This invention relates to improvements in nut-locks and rail-joints, the objects thereof being to provide an efficient means for preventing accidental disengagement of the nut and bolt caused by vibration of the rail-sections and for obviating danger of breaking the nut by contact with the periphery of an accidentally-derailed car-wheel.

The invention will be hereinafter fully described, and specifically set forth in the annexed claims.

In the accompanying drawings, forming part of this specification, Figure 1 is a side elevation illustrating two sections of rail connected to each other by means of my improved device. Fig. 2 is a cross-sectional elevation taken on a line $x$ $x$ of Fig. 1, and Fig. 3 is a sectional plan view taken on the line $y$ $y$ of Fig. 1.

In the practice of my invention I employ a fish-plate comprising a vertical wall A and a flanged extension A', which coincides with the angle of the rail-flange. This said flanged extension is provided upon its edge with recesses $a$ for the reception of railroad-spikes for fastening the device to a cross-tie. The flanged extension of the fish-plate is further provided with a suitable number of apertures $a'$, through which the bolts B pass. The oppositely-located fish-plate C is similar in construction and comprises a vertical wall C', with apertures therein, and a flanged extension $C^2$, having edge recesses $c$ and fitting snugly over the flange of the rail; but the outer surface of this said vertical wall is extended at an angle, as shown at 1, Fig. 2 of the drawings, and each end thereof is beveled, as shown at 2, Figs. 1 and 3 of the drawings. The face of this plate is further provided with a suitable number of recesses $c^2$ to receive nuts D, which engage the bolts B, which are provided with locking-collars D'. The surface of the plate is further provided with a longitudinal groove $c^3$ for receiving a tie-rod E. Each bolt B is provided upon the end thereof with a groove $b$, and each collar D' is provided upon its face with radial grooves $d$, adapted to register with the groove in the bolt and form a continuous longitudinal groove, as illustrated in Fig. 1 of the drawings. The tie-rod E engages these said grooves and locks the nut and bolt together, whereby accidental rotation of either the nut or bolt is prevented. This said tie-rod is provided upon each end thereof with an eye $e$, which engages a screw F, which is threaded through the beveled surface of the plate C at a point inside of the edge of the rail-tread, and it will be noted that all of the locking mechanism is upon a line inside of the said rail-tread edge, whereby should a car become derailed the wheel will slide over the angular surface of the plate C without danger of contacting with the bolt or nut or any of the locking mechanism, thus obviating danger of disconnecting the rail-sections by means of the car-wheels, and it is obvious that this locking device also prevents accidental disengagement of the bolts and nuts by means of the ordinary vibrations of the car-rail sections.

Having thus described my invention, what I claim as new, and desire to secure by Letters Patent, is—

1. A nut-lock comprising a collar having peripheral radial grooves, and a bolt having a longitudinal groove in the end thereof, and a rod engaging the said grooves, and means for fastening the ends of the rod for maintaining the same in a horizontal position, substantially as shown and described.

2. As a rail-joint and nut-lock, the combination with a fish-plate having recesses therein, of a bolt and nut, the said nut having a collar thereon with radial grooves in the face thereof, and the said bolt having a groove in the end thereof, and a tie-rod engaging the said groove and countersunk within a groove of the plate, and means for fastening the ends of the tie-rod to the plate, substantially as shown and described.

3. As a rail-joint and nut-lock, the combination with a fish-plate having an angular face, beveled ends, countersunk recesses and a horizontal groove, of a bolt having a groove in the end thereof, and a nut with a collar thereon, the said bolt passing through a rail-section and an oppositely-located fish-plate, and the said collar and nut being countersunk within a recess of the said fish-plate and means for locking the bolt and collar to each other and to the fish-plate, comprising a tie-rod engaging the horizontal groove of the fish-plate, substantially as shown and described.

In testimony that I claim the foregoing as my invention I have signed my name, in presence of two witnesses, this 27th day of December, 1898.

JOHN W. WARD.

Witnesses:
FRED T. CLARK,
ELWOOD WARD.